United States Patent [19]

Schepers et al.

[11] Patent Number: 4,621,259
[45] Date of Patent: Nov. 4, 1986

[54] CONSUMER ELECTRONICS EQUIPMENT COMBINATION CONSISTING OF A TELEVISION RECEIVER AND OF A VIDEO RECORDING AND/OR REPRODUCING APPARATUS

[75] Inventors: Charles Schepers, Karlsruhe; Wolfgang Schröder, Pforzheim, both of Fed. Rep. of Germany

[73] Assignee: International Standard Electric Corporation, New York, N.Y.

[21] Appl. No.: 476,694

[22] Filed: Mar. 18, 1983

[30] Foreign Application Priority Data

Mar. 25, 1982 [DE] Fed. Rep. of Germany ....... 3210893

[51] Int. Cl.⁴ .............................................. G09G 1/00
[52] U.S. Cl. .................................... 340/707; 340/708; 340/706; 358/183; 358/254; 358/198
[58] Field of Search ............... 340/707, 708, 703, 706; 358/183, 198, 254

[56] References Cited

U.S. PATENT DOCUMENTS

| | | | |
|---|---|---|---|
| 4,329,684 | 5/1982 | Monteath et al. | 340/707 |
| 4,337,480 | 6/1982 | Bourassin et al. | 358/183 |
| 4,396,941 | 8/1983 | Nishimura et al. | 358/254 |
| 4,488,179 | 12/1984 | Krüger et al. | 358/198 |
| 4,504,826 | 3/1985 | Leininger | 340/750 |

*Primary Examiner*—Marshall M. Curtis
*Attorney, Agent, or Firm*—Donald J. Lenkszus

[57] ABSTRACT

In order to be able to use the combination of a commercially available type of television receiver (1) with a commercially available type of video tape recorder (3) or video disk recorder, additionally also as a home computer, a data and address bus (32) is provided for additionally in the television receiver, to which there are connected a processor module 30, a computer module (33), a data storage (34), and a character generator (35). A computer control circuit (41) switches the equipment combination into a computer operational state in which the deflection circuit (40) and the video signal amplifier circuit (6) for the picture tube (7), are connected to the output of the character generator, and the recording and reproducing lines (21) of the video tape or video disk recorder are connected via a code converter (42) to the data and address bus (32). The user program (44) as selected by the user with the aid of a keyboard (10) or a light pen (26), is stored from the video tape (43) or the video disk into the data storage. The conversational operation (dialogue) with the user is effected during the execution of the selected user program, via the screen (36) of the television receiver and the keyboard (10) or the light pen (26). With the aid of an additional circuit arrangement in the television receiver, which is substantially smaller than an additional home computer would be, the much used consumer electronics equipment combination is given a full or adequate and highly flexible home computer function.

12 Claims, 1 Drawing Figure

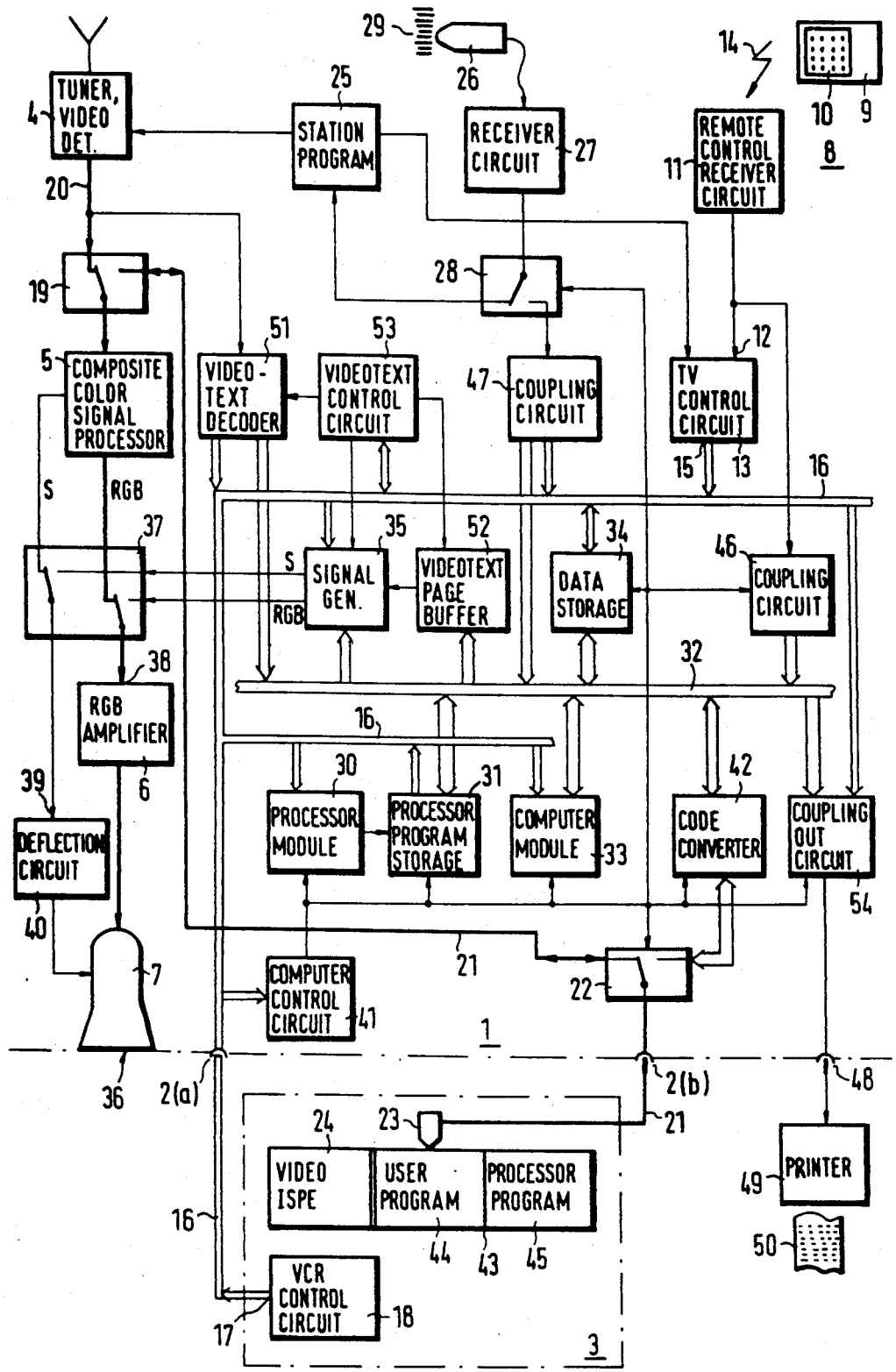

CONSUMER ELECTRONICS EQUIPMENT COMBINATION CONSISTING OF A TELEVISION RECEIVER AND OF A VIDEO RECORDING AND/OR REPRODUCING APPARATUS

The invention relates to an equipment combination of the type set forth in the preamble of claim 1. One such equipment combination is known, for example, from the combination of a commercially available type of television receiver containing a Videotext (Teletext) detector which can be operated via a remote control unit separated from the television receiver, with a commercially available type of video recorder. The remote control unit, together with a remote control receiver in the television receiver, forms an input device which is connected to a television control circuit of the television receiver. This control circuit, based on the input instructions, adjusts the television receiver to the desired operational states or else, in the case of a VCR adjustment via the remote control unit, applies the control instructions for the video cassette recorder (VCR) to a control bus which, via a connector, is in connection with the corresponding control bus of the VCR. The Videotext (Teletext) detector of the commercially available type of television receiver contains a data and address bus via which the Videotext (Teletext) information as filtered by the actual detector arrangement out of the composite color signal, is fed into the page buffer of the Videotext (Teletext) decoder. To this page buffer there is connected a character generator converting the information stored in the page buffer, into characters representable on the screen of the television receiver. The Videotext (Teletext) decoder as well as the video recorder are each controlled in this conventional equipment combination by a control circuit which is connected to the control bus.

With the conventional, commercially available kind of consumer electronics equipment combination, a program transmitted by a tv station can be received and directly displayed on the screen and/or recorded on the recording medium (videotape) of the video recorder. The program as recorded on the videotape may be played back at a later time and reproduced on the screen of the television receiver. Moreover, with the video detector on the remote control unit, it is possible to receive selected Videotext (Teletext) pages, to store them in the Videotext (Teletext) page buffer and to display them on the screen of the television receiver.

It is the object of the invention to design a television receiver in a consumer electronics equipment combination of the type mentioned hereinbefore, in such a way that this equipment combination can be used additionally as a home computer.

According to the invention, this object is achieved by taking the technical measures set forth in the characterizing part of claim 1. By taking these measures involving a relatively small additional investment in the television receiver arrangement, the user of such an equipment combination is offered a very flexible home computer system, which substantially enlarges the versatility of such an equipment combination. Compared with the commercially available home computer systems the investment additionally required for this purpose, is extremely small. Moreover, the storage or recording media of the video recording and/or reproducing apparatus, such as video recorders (VCR) or video disk recorders which are capable of being connected to the television receiver, have a very large storage capacity suitable for home computer operation.

Advantageous embodiments and further developments of the invention are set forth in the subclaims.

In the following, the invention will now be explained in greater detail with reference to preferred examples of embodiment. In the only figure of the accompanying drawing an equipment combination according to the invention is shown in the form of a block diagram. The equipment combination contains a television receiver 1 to the record-reproduce connector 2 of which a video recorder 3 is connected for serving as the video recording and/or reproducing apparatus. The television receiver contains an RF receiver circuit 4, a color signal conditioning circuit 5 and a video signal amplifier circuit 6 for amplifying the three color (RGB) signals for the picture tube 7.

Moreover, the television receiver contains an input device 8 consisting of a remote control unit 9 separated from the television receiver, and having an input keyboard 10 and a remote control receiver circuit 11. The output of this receiver circuit 11 is connected to an input 12 of a television receiver control circuit 13. The tv receiver control circuit 13, by means of the input signals 14 transmitted wireless from the remote control unit 9 to the receiver circuit 11, sets the television receiver 1 to the desired operational state, e.g. by setting the desired receiving channel on the RF receiver circuit 4. When the video recorder (VCR) 3 as connected to the television receiver 1 is controlled via the input device 8, then the corresponding input signals 14 are applied via the bus output 15 of the television receiver control circuit 13, to the control bus 16 and from there, via a connector part 2a of the connector 2, to the bus terminal 17 of a control circuit 18 of the VCR. In accordance with the input signals 14, the VCR control circuit 18 adjusts the VCR to the operational state selected with the aid of these input signals. At the same time, in this operational state, the television receiver control circuit 13, by switching a composite color signal changeover switch 19 in the video signal path 20 of the television receiver, the input of the color signal conditioning circuit 5 is connected to the record or reproduce lines 21 extending to the VCR 3. These lines 21 extend via a signal path changeover switch 22 and a connector part 2b of the record and reproduce connector 2 of the television receiver to the recording and scanning device 23 for the recording medium (videotape) 24 of the video cassette recorder (VCR) 3.

Moreover, in the given example of embodiment, the television receiver 1 contains a station programming device 25 in which the data relating to individual station programs as selected by the user, are stored. For the storing of these data, the television receiver is provided with a light pen (also known as "Telepen", bar-code wand or scanner) 26 which, via a light-pen receiver circuit 27 and a changeover switch 28, is connected to the station programming device 25. The light pen 26 serves to scan a bar code 29 containing the characteristics of the selected station program.

In order to be able to use the equipment combination consisting of the television receiver 1 and of the video cassette recorder (VCR) 3 as a home computer, the television receiver is still provided with the following additional circuit arrangements: a processor module 30 which is connected to the control bus 16 and controls the stepwise process sequence of a user program, a processor program storage 31 whose stored processor program is directly assigned to the individual process steps of the processor module 30 and fixes the program language for the program sequence of the processor module, and is connected with its bus terminals to the control bus 16 and to a data and address bus 32, a computer module 33 likewise connected to the control bus and the data and address bus, for performing the computer and the relational operations necessary for a home computer, a data storage 34 connected to the data and address bus 32 and to the control bus 16, for storing the data of a user program as well as of the data and information resulting from the computer and relational operations, a character generator 35 connected to the control bus 16 and the data and address bus 32 for converting the characters as applied to its data input, into characters and symbols visually readable on the screen 36 of the color picture tube 7, an RGB changeover switch 37 which, in the computer operational state of the television receiver connects the RGB inputs 38 of the video signal amplifier circuit 6 and the synchronizing input 39 of the deflection circuit 40 to the outputs of the character generator 35, and finally a computer control circuit 41 connected to the control bus 16 which, in the presence of a computer instruction e.g. from the remote control unit 9 of the television receiver, switches the equipment combination into the computer operational state.

In the shown example of embodiment, the equipment combination 1/3 is controlled into the computer operational state by a control instruction triggered on the remote control unit 9, which is applied via the tv receiver control circuit 13 to the control bus 16 and, via this control bus, switches on the computer control circuit 41. In this state all modules (chips) and circuit arrangements 30 to 35 are turned on. Moreover, the recording and reproducing lines 21 of the video recorder are connected, by means of the signal path changeover switch 22 to a code converter 42 by which the code of the characters stored on the video tape 24 are converted into a code suitable for the data transmission on the data and address bus 32, and vice versa. The RGB and synchronizing inputs of the video signal amplifier circuit 6 and of the deflection circuit 40 are connected, via the RGB changeover switch 37, to the outputs of the character generator 35. In the VCR 3 there is inserted the video tape on which user programs 44 and, if so required, processor programs 45 are stored. During the initial program steps of the processor module, the VCR 3, by means of control instructions and information supplied via the control bus, is caused to retrieve on the storage medium 43 the processor program 45 required for the data processing in the television receiver 1, for storing it into the processor program storage 31 unless this processor program storage 31 is already firmly and non-traceably programmed with a processor program in accordance with a particularly advantageous type of embodiment of the equiment combination. Thereafter, in a further advantageous embodiment of the shown equipment combination, the user, by way of a display on the screen 36, is requested to select the desired user program. This selection may be effected, for example, by way of keying a code number (prefix) into the keyboard 10 of the remote control unit 9, and which may be taken, for example, from a program table. These data are applied from the output of the receiver circuit 11, via a coupling circuit 46, to the data and address bus 32 and from there, for example, into the data storage 34. In the computer operational state of the television receiver, this coupling circuit converts at the output of the receiver circuit 11, the respective characters into the character code as used on the data and address bus 32. The coupling circuit 46 only remains to be connected to the data and address bus 32, as long as data are requested via the input device 8. The same also applies to a coupling circuit 47 by which the output of the light pen receiver circuit 27 is coupled to the buses 16 and 32. Upon completion of the data input, these data are fed from the data storage 34 as selection information, via the control bus 16, into the VCR 3, causing the associated user program 44 to be retrieved on the video tape 43 and, via the recording and scanning device 23 and the code converter 42, to be stored into the data storage 34.

In a modified embodiment of the equipment combination as shown in the accompanying drawing, the instructing and selecting data relating to a user program selected by the user in a program guide, are scanned with the aid of the light pen 26 attached to the television receiver. For this purpose, the TV Guide contains the associated data for each user program, printed in the form of a bar code capable of being scanned with the aid of the light pen. According to another embodiment of the shown equipment combination it is also possible to transfer a user program of small extent recorded in the form of a bar code in a program catalogue or program manual, directly to the data storage 34 of the television receiver by means of the light pen 26. In both cases the changeover switch 28 connects the output of the light pen receiver circuit 27 to the input of the coupling circuit 47.

Following these input procedures, there are executed the program steps as controlled by the processor module 30, within the scope of the stored user program, if so required, in a conversational mode (dialogue) with the user. For this purpose, for example, the necessary user steps are displayed on the screen 36, which the user then has to carry out by means of either the light pen 26 or the keyboard 10 of the input device 8. Upon execution of all steps of the selected user program, the entire user program or else associated new data can again be stored on the video tape 43. The data to be stored are applied from the data storage 34, via the data and address bus 32 and via the code converter 42, to the scanning and recording device 23 of the VCR 3 and, at the intended point of the video tape 43 controlled via the control bus 16, stored on the video tape.

In a special type of design of the shown equipment combination, the television receiver 1 contains a plug-in facility 48 for a printer 49 which, via a coupling-out circuit 54 controlled by the control bus, is connected to the data and address bus 32, for printing the data obtained in the course of executing the selected user program, on a paper tape 50.

In cases where the television receiver 1, in an equipment combination as shown in the drawing, comprises a Videotext (Teletext) facility with a Videotext decoder 51, a page buffer 52 and a character generator connected thereto, which is controlled by a Videotext control circuit 53, then this character generator, including its preceding page buffer, can be used as a character generator 35 for the computer facility, and the data and address bus of the Videotext facility can be used as a data and address bus 32 for the computer facility of the television receiver. In this particular case, the character generator is not connected directly to the data and address bus 32, but via the page buffer 52.

The data, control and address instructions can each be transferred to separate bus systems specially provided therefor or else, when provided with a type identification, may be exchanged on a common bus system.

We claim:

1. An improved consumer electronics equipment combination including a television receiver containing a control bus for control instructions and selecting information, an input device with a keyboard, a television control circuit connected to the control bus for adjusting the operating states of the television receiver selected by means of the input device, a data and address bus with a data storage connected thereto, and a character generator capable of being optionally connected to the input of a video signal amplifier circuit for the picture tube, and with a video recording and reproducing apparatus containing an interchangeable video information storage medium capable of being scanned, which is connected to a record-reproduce connector of the television receiver, whose control circuit for adjusting its operating state is connected via the record-reproduce connector to the control bus of the television receiver and whose video information input and output is connected to the video signal path of the television receiver via the record-reproduce connector, said improvement comprising:

the video signal path (21) of the recording and/or reproducing apparatus (3), extending via the record-reproduce connector (2) of the television receiver (1), includes a signal path changeover switch (22) having a first switch position which connects the signal path to the video signal path (20) of the television receiver and a second switch position which connects the video signal path of the recording and/or reproducing apparatus, via a code converter (42), to the data and address bus (32), the control bus (16) is connected to a computer control circuit (41) including means in response to a computer instruction appearing at the output of the input device (8) or of the television control circuit (13) for switching the television receiver into a computer operational state, the storage medium (43) of the video recording and/or reproducing apparatus (3) includes at least one selectable user program (44), and the computer operational state of the television receiver connects the input (38) of the video signal amplifier circuit (6) to the output of the character generator (35), connects a processor module (30) and a computer module (33) to the control bus (16) and the data and address bus (32), switches the signal path changeover switch (22) to its second switch position, and connects the data outputs of the input device to the data and address bus (32) via a coupling circuit (46).

2. An equipment combination as claimed in claim 1, characterized by an input device (27) provided with a light pen (26) for optically scanning a bar code (29).

3. An equipment combination as claimed in claim 2, characterized in that the light pen (26) forms part of a storage arrangement (25) of the television receiver (1) for storing transmitting station program data scanned with the aid of the light pen, and that between the light pen and the storage arrangement there is arranged a changeover switch (28), and that the light pen, in the computer operational state of the television receiver is connected, via the changeover switch, to the input of a coupling circuit (47) whose outputs are connected to the bus system (16, 32).

4. An equipment combination as claimed in claim 1, characterized in that the processor module (30) comprises a write-in type processor program storage (31), and that the associated processor program (45) for the processor module is selectably stored on the storage medium (43) of the video recording and/or reproducing apparatus (3), containing at least one user program (44).

5. An equipment combination as claimed in claim 1, characterized in that a printer (49) is connected to the data and address bus (32) via a coupling-out circuit (54).

6. An equipment combination as claimed in claim 2, characterized in that the processor module (30) comprises a write-in type processor program storage (31), and that the associated processor program (45) for the processor module is selectably stored on the storage medium (43) of the video recording and/or reproducing apparatus (3), containing at least one user program (44).

7. An equipment combination as claimed in claim 3, characterized in that the processor module (30) comprises a write-in type processor program storage (31), and that the associated processor program (45) for the processor module is selectably stored on the storage medium (43) of the video recording and/or reproducing apparatus (3), containing at least one user program (44).

8. An equipment combination as claimed in claim 2, characterized in that a printer (49) is connected to the data and address bus (32) via a coupling-out circuit (54).

9. An equipment combination as claimed in claim 3, characterized in that a printer (49) is connected to the data and address bus (32) via a coupling-out circuit (54).

10. An equipment combination as claimed in claim 4, characterized in that a printer (49) is connected to the data and address bus (32) via a coupling-out circuit (54).

11. An equipment combination as claimed in claim 6, characterized in that a printer (49) is connected to the data and address bus (32) via a coupling-out circuit (54).

12. An equipment combination as claimed in claim 7, characterized in that a printer (49) is connected to the data and address bus (32) via a coupling-out circuit (54).

* * * * *